(12) United States Patent
Whitehead

(10) Patent No.: US 6,243,218 B1
(45) Date of Patent: Jun. 5, 2001

(54) MIRROR ACTUATOR

(75) Inventor: Peter J. Whitehead, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/408,867

(22) Filed: Sep. 29, 1999

(51) Int. Cl.[7] .................................................. G02B 7/182

(52) U.S. Cl. .......................... 359/877; 359/871; 359/872; 359/841

(58) Field of Search ...................................... 359/877, 871, 359/872, 841; 248/476, 477

(56) References Cited

U.S. PATENT DOCUMENTS

| 5,210,651 | * | 5/1993 | Shibuya et al. | 359/841 |
|---|---|---|---|---|
| 5,424,898 | | 6/1995 | Larson et al. | 361/101 |
| 5,579,178 | * | 11/1996 | Mochizuki | 359/841 |
| 5,659,423 | | 8/1997 | Schierbeek et al. | 359/604 |
| 5,670,935 | | 9/1997 | Schofield et al. | 340/461 |
| 5,796,176 | | 8/1998 | Kramer et al. | 307/10.1 |
| 5,900,999 | | 5/1999 | Huizenga et al. | 359/877 |

OTHER PUBLICATIONS

Figure A: Design Picture of an Allied Signal Aerospace Traveling Wave Ultrasonic Motor, obtained Sep. 2, 1999, from the University of Missouri–Rolla website (www.um-r.edu).

* cited by examiner

*Primary Examiner*—Mohammad Sikder
(74) *Attorney, Agent, or Firm*—Van Dyke, Gardner, Linn & Burkhart, LLP

(57) ABSTRACT

A mirror actuator is provided for an exterior rearview mirror assembly. The mirror actuator comprises a non-armature electrical motor. Preferably, the mirror actuator comprises an ultrasonic motor. The mirror actuator is useful as a power-fold exterior mirror actuator to pivot a folding portion of a mirror assembly about a base or non-folding portion attached to the vehicle. The mirror actuator preferably comprises a traveling wave ultrasonic motor and causes rotation of a rotating member attached to the folding portion of the mirror via a traveling wave generated along a driving disc or stator. The ultrasonic motor provides a sufficient torque to the folding portion of the mirror, such that worm gears and other gearing mechanisms are not required to generate additional torque. The mirror actuator may also be useful as a reflective element positioning actuators to adjust an angle of the reflective element of the mirror relative to the housing of the mirror assembly. Preferably, the reflective element positioning actuators are linear traveling wave ultrasonic motors.

6 Claims, 3 Drawing Sheets

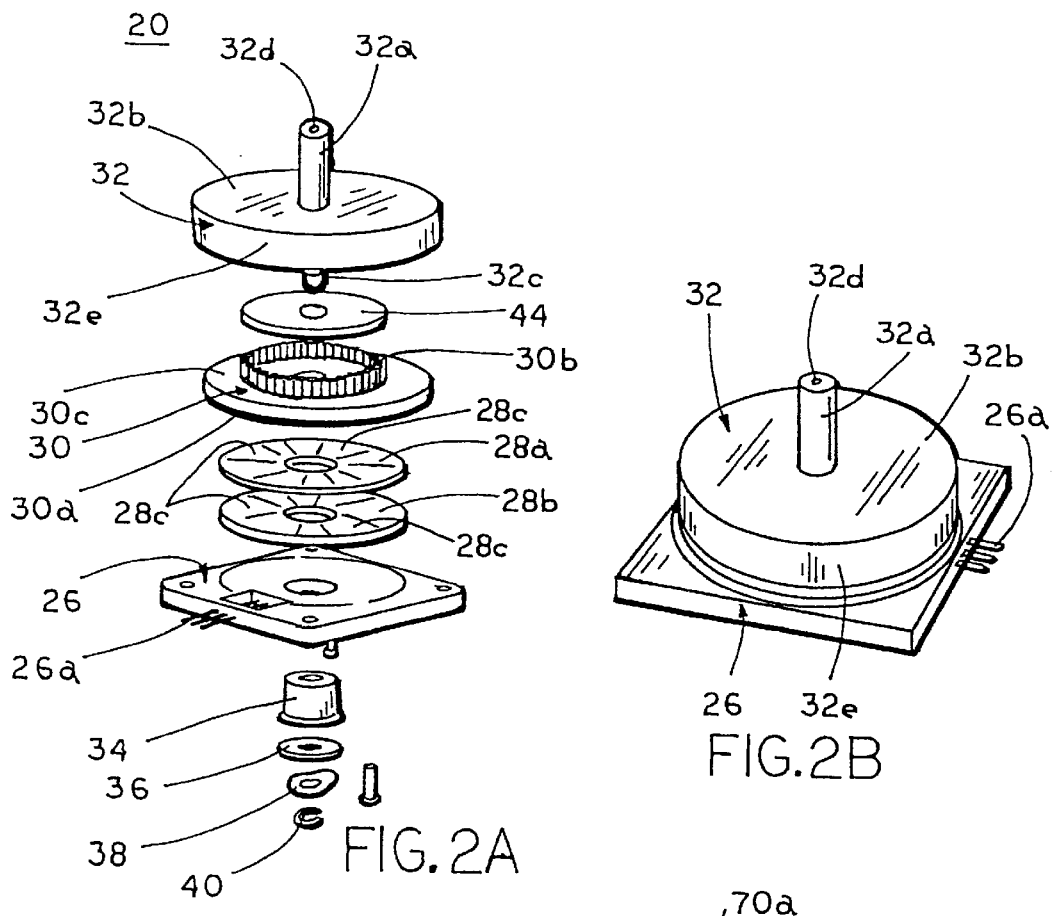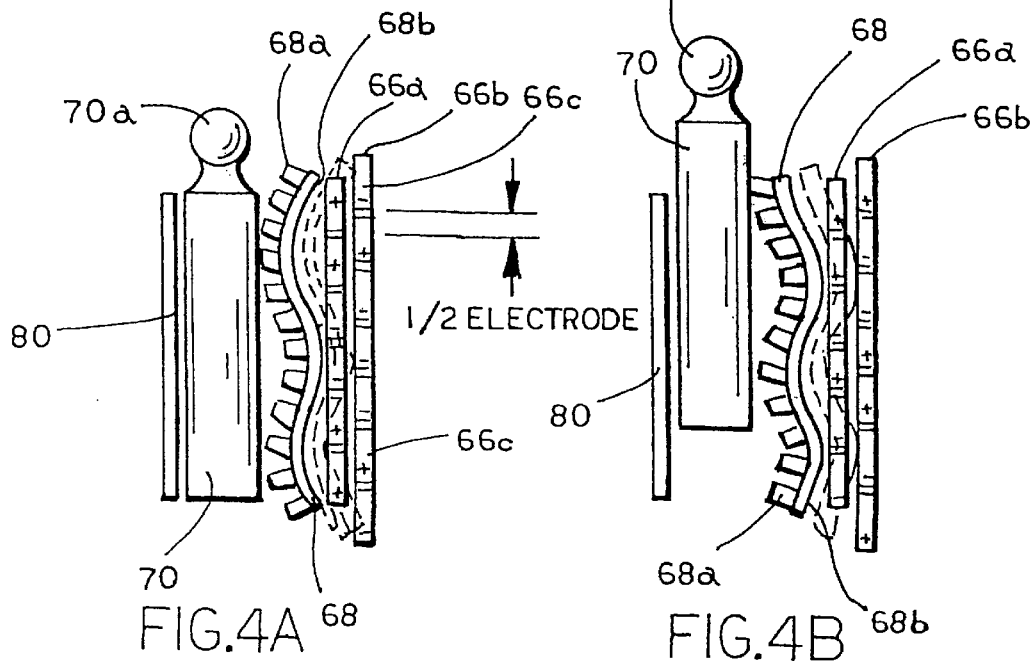

MIRROR ACTUATOR

BACKGROUND OF THE INVENTION

The present invention relates generally to exteriorly mounted rearview mirrors for vehicles and, more particularly, to power folding exterior rearview mirrors which fold between an operable position and a folded position in response to an electronic actuator, and to motors for positioning the field of view of exterior rearview mirror reflectors.

Exterior rearview mirrors are located on one or both sides of a vehicle to provide a vehicle operator with a view rearward and to either side of the vehicle. Many vehicles provide rearview mirrors which are foldable between an operable position, where the rearview mirror extends outwardly from the side of the vehicle, and a folded position, where the rearview mirror is folded alongside the vehicle. Conventional folding mirrors typically include a folding portion and a substantially fixed, non-folding portion, which is mounted adjacent to a side or side window of the vehicle. The folding portion pivots about a pivot axis defined by a pivot spindle, which is typically secured to the non-folding portion. While many of these folding mirrors may be manually folded between the operable and folded positions, or may move towards the folded position if impacted such as in breakaway mirrors, many vehicles now include power folding mirrors to facilitate pivoting of the mirror housing via a manual control within the vehicle or in response to an electronic signal.

Power folding mirrors and electrically operated mirror reflector positioning power packs typically include an electronic actuator, such as a conventional motor with a rotating output shaft. Moreover, powerfold actuators and mirror reflector positioning power packs/actuators commercially used utilize conventional armature motors which consist typically of an armature that is surrounded by a coil or coils (typically consisting of multi-wire windings) passing electrical current. The shaft of the motor turns by the actuator responding to electromagnetic fields generated by passage of electricity through the coil(s) of the motor. The need to accommodate at least an armature and coil(s) in the motor housing can lead to a relatively large package that in turn presents difficulties accommodating the actuator in the restricted space available in exterior rearview mirror assemblies. Thus, there is a need for a contact motor for such applications.

In powerfold mirror actuator applications, the motor is operable to rotate the output shaft, which engages multiple gears or worm drives which further engage the pivot spindle on the non-folding portion of the mirror. Rotation of the output shaft causes relative rotation between the motor and the spindle to thus pivot the mirror housing about the spindle. Such standard motors operate at relatively high RPMs and have a low output torque. Accordingly, multiple gears are required between the output shaft and the pivot spindle in order to generate enough torque to move the mirror about the pivot spindle. This results in multiple moving parts within the system, which may further result in increased weight and reliability concerns with respect to the mirror system.

Because there is relative movement between the folding portion and non-folding portion of the mirror as the mirror is folded inwardly toward or outwardly from the vehicle, difficulties may arise in routing an electronic cable or wiring from within the vehicle or door to the actuator positioned within the folding portion of the mirror assembly. Typically, corresponding openings or slots must be formed through one or both of the folding portion and the non-folding portion of the mirror assembly. This allows the cable to be routed from the non-folding portion into the folding portion such that the cable may move relative to one or both portions as the mirror is folded, with minimal interference with the movement of the folding portion of the mirror.

SUMMARY OF THE INVENTION

The present invention is intended to provide a compact, efficient non-armature motor drive for exterior rearview mirror assemblies, such as for a powerfold mirror actuator or for a mirror reflector positioning actuator. The mirror actuator does not require multiple gears or the like, and thus is highly efficient and reliable.

According to an aspect of the present invention, an exterior rearview mirror assembly for a vehicle comprises a movable portion and a non-movable portion, and an actuator comprising a non-armature electrical motor operable to move the movable portion relative to the non-movable portion. Preferably, the non-armature electrical motor comprises an ultrasonic motor and, most preferably, a traveling wave ultrasonic motor. In one form, the mirror assembly comprises a power folding mirror assembly. The movable portion comprises a mirror housing and the non-movable portion comprises a mirror mount. The actuator is operable to pivot the mirror housing relative to the mirror mount between an operable position and a folded position. In another form, the movable portion comprises a reflective element and the non-movable portion comprises a mirror housing. The actuator is operable to pivot the reflective element relative to the mirror housing.

According to another aspect of the present invention, an exterior mirror assembly for a vehicle comprises a mirror system comprising a folding portion and a non-folding portion and a mirror actuator operable to pivot the folding portion relative to the non-folding portion. The folding portion comprises a reflective element and the non-folding portion is adapted to mount to the vehicle. The folding portion is pivotable relative to the non-folding portion between an operating position and a folded position. The mirror actuator comprises a non-armature motor, preferably an ultrasonic motor. Most preferably, the mirror actuator comprises a traveling wave ultrasonic motor, which is operable to pivot a rotating member mounted to the folding portion of the mirror in response to a vibrational wave produced in a piezo-electric element mounted to the non-folding portion. The vibrational wave is produced by applying a phased voltage to the piezo-electric element, which may be fixedly secured to an elastic stator. A resultant flexural vibration of the stator produced by the piezo-electric element frictionally drives and rotates the rotating member relative to the piezo-electric element. In one form, a passageway is formed through a shaft of the rotating member. A vehicle wiring may be connected to at least one electronic mirror accessory via the passageway.

According to another aspect of the present invention, a reflective element positioning actuator comprises a non-armature electrical motor for adjustably positioning a reflective element of a mirror relative to a housing of the mirror. The non-armature electrical positioning actuator preferably comprises an ultrasonic motor and, most preferably, a linear traveling wave ultrasonic motor. The ultrasonic positioning actuator comprises a base, at least two piezo-electric strips, and a movable member. The base provides a phased voltage to the piezo-electric strips. The piezo-electric strips extend and retract as a traveling wave along a length of the strips in response to the phased voltage. The piezo-electric strips extend to impact the movable member to cause linear movement of the movable member in a direction generally opposite to the traveling wave. The movable member is movable to adjust a position of the reflective element relative to the housing of the mirror.

These and other objects, advantages, purposes and features of this invention will become apparent upon review of the following specification in conjunction with the drawings.

BRIEF DESCRIPTION OF THE DRAWINGS

FIG. 2A is an exploded view of a traveling wave ultrasonic motor useful with the present invention;

FIG. 2B is the traveling wave ultrasonic motor of FIG. 2A, shown in its assembled state.

FIGS. 4A and 4B are schematic diagrams of one of the mirror positioning actuators shown in FIG. 3.

DESCRIPTION OF THE PREFERRED EMBODIMENTS

Figure 1:
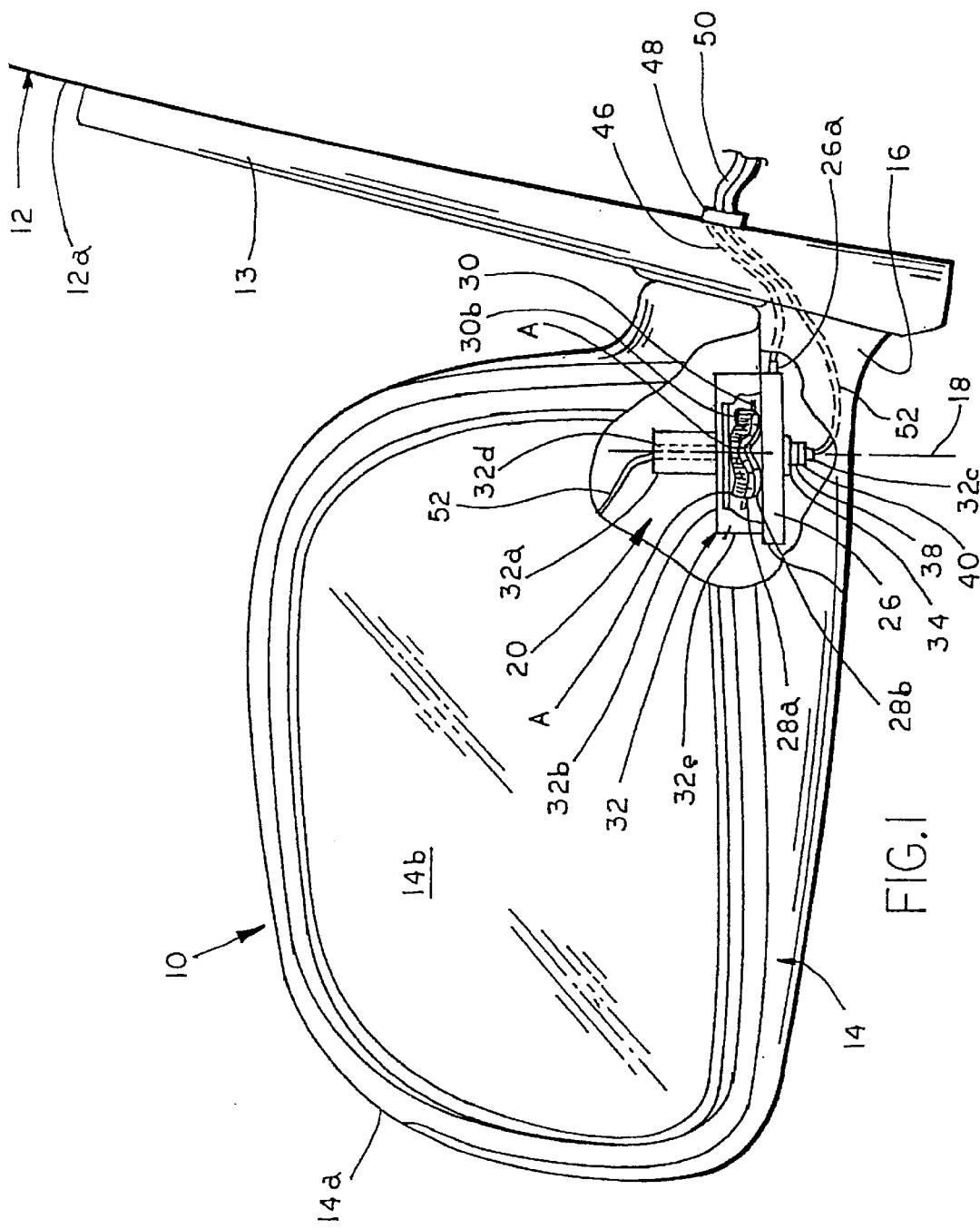
FIG. 1 is a view of a mirror assembly, looking forwardly toward the front of the vehicle, showing a partial section to reveal a powerfold mirror actuator in accordance with the present invention.

Referring now specifically to the drawings, and the illustrative embodiments depicted therein, a mirror assembly 10 is mounted to a vehicle 12 (FIG. 1). The mirror assembly 10 is shown as a powerfold mirror assembly and comprises a folding portion 14 and a non-folding or base portion 16. Folding portion 14 includes a housing 14a and a reflective element 14b, which may be manually or electronically adjustably positioned relative to housing 14a. The folding portion 14 pivots about a pivot axis 18 relative to non-folding portion 16 in response to an output of an actuating device 20. Actuating device 20 comprises a non-armature electrical motor. Preferably, actuating device 20 comprises an ultrasonic motor and, more preferably, a traveling wave ultrasonic motor, which is operable to rotate the folding portion 14 about axis 18 via a flexural vibration of components within the actuator 20, as is known in the art of ultrasonic motors and as discussed below. Non-folding or base portion 16 is fixedly secured along a side 12a of vehicle 12, and may be secured to a trim piece or sail 13 positioned along a forward, lower corner of a side window of vehicle 12. By implementing a non-armature electrical motor, and more preferably an ultrasonic motor, as an actuating device 20, the present invention provides a high torque output, which enables direct driving of the folding portion 14 of the mirror 10, without multiple gears and the like. The ultrasonic actuating device 20 is highly compact and has a low weight, and further requires a minimal number of moving parts, such that the actuating device 20 may be easily packaged within the mirror housing and is highly reliable over conventional motors with rotating output shafts. Ultrasonic actuating device 20 is preferably a traveling wave ultrasonic motor, such as the traveling wave ultrasonic motor manufactured by Allied Signal Aerospace Company, Kansas City Division, of Kansas City, Mo., and shown in FIGS. 2A and 2B. However, actuating device 20 may be other known non-armature electrical motors or ultrasonic motors, such as ultrasonic disc motors or ultrasonic ring motors, without affecting the scope of the present invention.

As shown in FIGS. 1 and 2A, actuating device 20 preferably comprises a base 26, which preferably is fixedly mounted to base portion 16 of mirror assembly 10, at least two piezoelectric or piezo-ceramic elements 28a and 28b, a stator or driving disc 30, and a rotational member or rotor 32, which may be fixedly secured to folding portion 14 of mirror assembly 10. Rotor 32 includes a shaft 32a which protrudes from a generally circular portion 32b. Shaft 32a is fixedly connected to folding portion 14, such that rotation of rotor 32 causes a corresponding rotation or pivoting of folding portion 14 of mirror assembly 10 relative to base portion 16. A second shaft 32c protrudes in the opposite direction of shaft 32a and extends through corresponding openings in stator 30, piezo ceramic elements 28a and 28b, and base 26 for securing the actuating device 20 together as an assembled unit. Shafts 32a and 32c define pivot axis 18 and may further include a passageway 32d extending therethrough for routing a mirror wiring between a vehicle wiring and the mirror.

A bearing 34, shim 36, spring 38 and clip or other fastener 40 may be included at a lower surface of base 26 to secure the components to shaft 32c, while allowing relative rotation between shaft 32c, and thus shaft 32a of rotor 32b, and the other components of the ultrasonic motor 20. Spring 38 may be a coil spring or a cup spring, as shown in FIG. 2A, to retain pressure or clamping force on the components. Rotor 32 includes a cylindrical sidewall 32e which may extend from an outer circumference of circular portion 32b. When assembled, the sidewall 32e extends at least partially over the driving disc 30 and the piezo ceramic elements 28a and 28b to substantially encase the components between base 26 and rotor 32, as shown in FIG. 2B.

Base 26 includes a connector 26a for electrical connection to a mirror wiring or harness 46 and/or a vehicle wiring 50 for providing power to actuating device 20. Base 26 includes a control (not shown) which is operable to selectively provide a phased voltage which has a resonance frequency, preferably of more than 20,000 Hz, to multiple electrodes 28c along the piezo ceramic elements 28a and 28b. The control is operable to generate an appropriate signal and sequences the order of excitation of the electrodes on the piezo ceramic elements 28a and 28b. Sequential excitation of the elements 28a and 28b produces a traveling wave of flexural vibration within the piezo ceramic elements, as is known in the art.

Preferably, there are at least two generally circular or disc-shaped piezo ceramic elements 28a and 28b, which are bonded or otherwise secured to a lower surface 30a of stator 30. As is known in the art, the piezo ceramic elements have multiple sector electrodes or piezo crystals 28c on their surfaces. The piezo crystals are spaced along the surface of the piezo ceramic elements 28a and 28b as generally pie-shaped electrodes. The two elements 28a and 28b are rotated by half a piezo crystal or electrode relative to one another. By selectively energizing the crystals in a desired sequence, a wave traveling around the elements may be generated due to the flexural vibration of the elements. The selected sequence of energization of the crystals determines the direction of the wave and thus the direction of rotation of rotor 32, which is generally opposite the direction of travel of the wave form.

Stator 30 is substantially smooth on lower surface 30a, and preferably includes a plurality of teeth or combs 30b protruding outwardly from an upper surface 30c. Teeth 30b are preferably included on stator 30 to enhance the gripping effect between rotor 32 and stator 30 and further function to amplify the vibrations of the stator. Stator 30 is formed of an elastic material, such that stator 30 flexes, such that teeth 30b extend and retract, corresponding to the traveling wave form of the piezo elements 28a and 28b. Because the piezo ceramic elements 28a and 28b are secured to lower surface 30a of stator 30, flexural vibration in the piezo elements results in a corresponding flexing of the elastic stator 30, such that the traveling wave is reproduced on stator 30 in response to the excitation of the piezo elements 28a and 28b.

Preferably, a friction liner 44 is bonded or otherwise secured to rotor 32 or shaft 32c of rotor 32, such that rotation of the friction liner causes a corresponding rotation of rotor 32. The friction liner enhances gripping between teeth 30b of stator 30 and rotor 32, to improve efficiency of rotation of rotor 32 in response to excitation of the piezo ceramic elements. As assembled, a small gap may exist between the stator teeth and the friction liner, which enables the teeth to extend and impact with the friction liner when a voltage is applied to the piezo elements, as discussed below.

As shown in FIG. 1, base 26 of actuating device 20 is preferably mounted along an upper portion of base or non-folding portion 16 of mirror assembly 10. Wiring 46 may connect to connector 26a on base 26 to provide electrical power to actuating device 20. The wiring 46 may connect at its other end to a connector 48 to facilitate easy connection of the wiring 46 to vehicle wiring or harness 50 within vehicle 12. Preferably, a second mirror wiring 52 may also be connected to connector 48 for providing power to one or more mirror reflector positioning actuators, such as a conventional actuator or an ultrasonic reflector positioning actuator 60 (FIG. 3), within folding portion 14 of mirror assembly 10. The wiring 52 may further provide power and/or control to lights, such as turn signals, stop lamps, safety lights, ground illumination lights or the like, such as disclosed in commonly assigned, co-pending U.S. Pat. application Ser. No. 09/102,414, filed Jun. 22, 1998 by Pastrick et al., now U.S. Pat. No. 6,176,602, the disclosure of which is hereby incorporated herein by reference, electro-optic or electrochromic controls for the mirror, such as disclosed in commonly assigned U.S. Pat. No. 5,659,423, issued to Schierbeek et al., the disclosure of which is hereby incorporated herein by reference, exterior temperature sensors, cameras or sensors, such as disclosed in commonly assigned U.S. Pat. No. 5,670,935, issued to Schofield et al., the disclosure of which is hereby incorporated herein by reference, or the like, which may be mounted within housing 14a of folding portion 14. Preferably, shafts 32a and 32c of rotor 32 may be hollow to provide passageway 32d therethrough. Mirror wiring 52 may then be routed through passageway 32d and into folding portion 14. This facilitates simplified routing of the wiring 52, and substantially precludes the necessity of an additional hole or slot through base 16 and folding portion 14 of mirror assembly 10. This also provides a safer routing for wiring 52, since wiring 52 no longer moves relative to either base 16 or folding portion 14 as folding portion 14 is pivoted about axis 18. It is further envisioned that rotor 32 and shafts 32a and 32c may be integrally molded to an interior portion of folding portion 14 of mirror assembly 10 to provide for simplified attachment of folding portion 14 to non-folding portion 16 and improved retention of shaft 32a relative to folding portion 14.

The operation of an ultrasonic motor is known in the art, and will not be discussed in detail herein. Suffice it to say that as the piezo ceramic elements 28a and 28b are excited by a phased voltage applied at a resonant frequency, the piezo crystals 28c on elements 28a and 28b vibrate toward and away from the base 26 in accordance with the applied voltages. As shown in FIG. 1, this produces a wave form of vibrations traveling around the piezo ceramic elements, which is correspondingly reproduced on stator 30. As the wave form travels around the stator 30, the teeth 30b on stator 30 extend and impact friction liner 44. The wave form continues to travel such that teeth 30b slightly pivot while they are engaged with friction liner 44 before retracting away from friction liner 44 as the wave form moves further around stator 30. This sequential impacting and pivoting of teeth 30b on rotor 32 causes rotor 32 to rotate in a direction opposite to the traveling direction of the wave. This is due to the frictional forces produced between the rotor and the teeth 30b, which contact the friction liner 44 or rotor 32 along an upper portion of the wave on stator 30, as generally shown in FIG. 1 at A. As teeth 30b extend, they remain engaged with friction liner 44 or rotor 32 due to spring 38 biasing the components together along shaft 32c of rotor 32.

As actuator 20 is actuated to pivot folding portion 14 about axis 18, one or more detentes or stops (not shown) may be provided to establish an operative position and/or a folded position. Alternately, an electronic sensor, such as a proximity sensor, micro-switch or the like, may provide a stop signal to the ultrasonic motor when the folding portion 14 is pivoted to its operative position or folded position. It is further envisioned that a solenoid clamp may be implemented to substantially retain the mirror in its folded or operable position. The clamp may be produced by energizing only one set of the piezo elements, which causes at least a portion of stator 30 and teeth 30b to extend and contact friction liner 44, thus clamping the stator to the rotor and substantially precluding rotation of the rotor. Clearly, other means for limiting movement of folding portion 14 relative to non-folding portion 16 may be implemented, without affecting the scope of the present invention.

The non-armature motor provides a low speed and high torque rotation to the rotor 32, such that the motor is highly power efficient. This enables the motor to directly drive folding portion 14 without any speed reducing or torque enhancing gearing mechanisms. The non-armature motor is highly compact and may be easily packaged within the housing of mirror assembly 10. Because the ultrasonic motor drives the rotor by flexural vibration in the stator and ceramic elements, there are no moving or rotating components within the ultrasonic motor, which results in a quieter and more reliable actuating device. This also results in a lower mass unit, which is highly desirable for automotive applications. Although shown and described with base 26 mounted to a non-folding portion 16, it is envisioned that the ultrasonic motor may be inverted such that base 26 is mounted in folding portion 14 and rotor 32 is mounted to a non-folding portion 16. Wire 46 may then be routed through passageway 32d and connected to connector 26a on base 26 within folding portion 14. Furthermore, rotor 32 may be integrally formed with non-folding portion 16.

Figure 3:
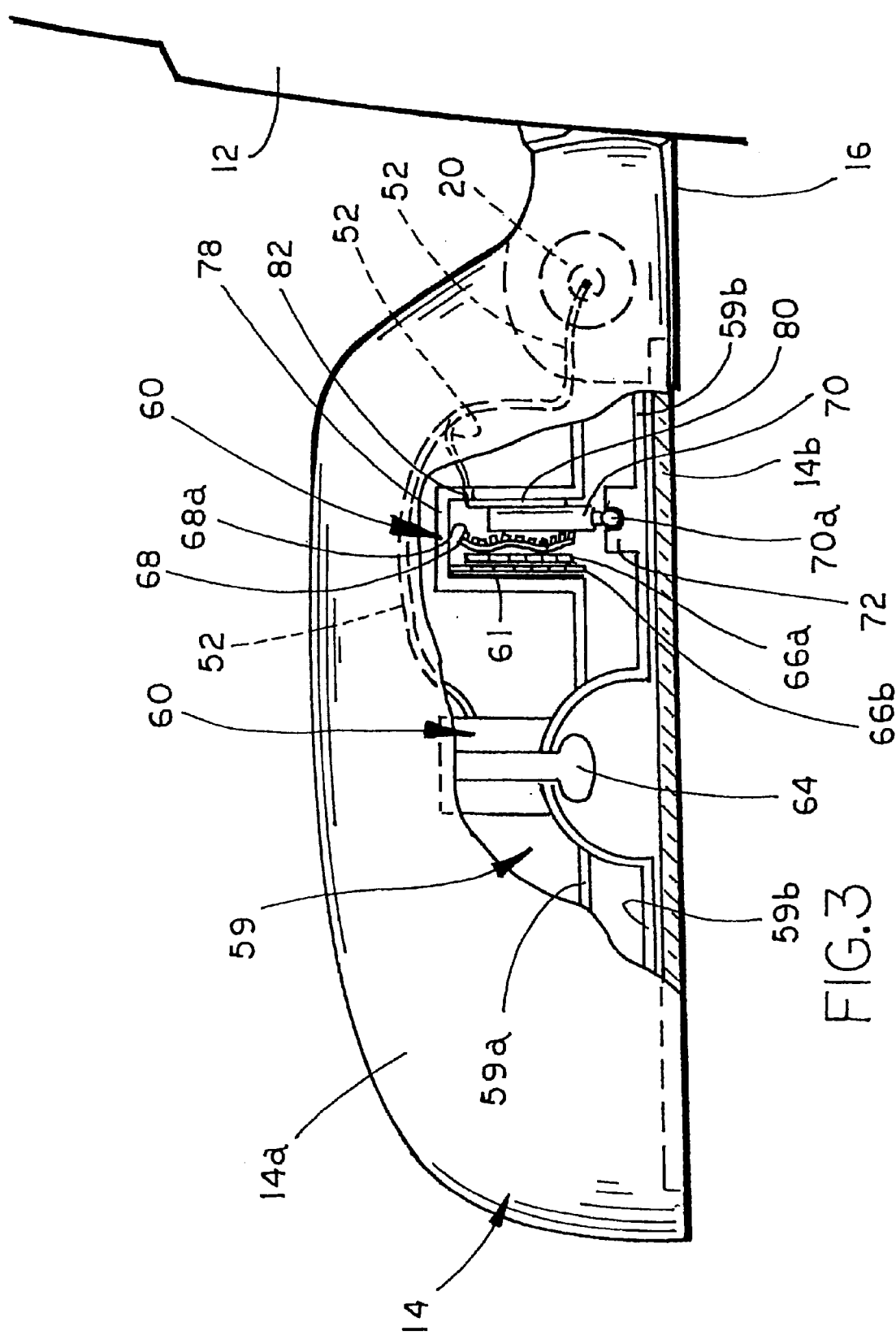
FIG. 3 is a top plan view of the mirror in FIG. 1, showing a partial section to reveal mirror positioning actuators for adjustably positioning a reflective element of the mirror relative to a housing of the mirror.

Referring now to FIGS. 3, 4A and 4B, it is further envisioned that a reflective element positioning actuator 60, for adjusting the position of reflective element 14b of mirror assembly 10 relative to the mirror housing 14a, may comprise a non-armature electrical motor. Preferably, a pair of mirror positioning actuators 60 may be implemented to pivot reflective element 14b in both horizontal and vertical directions about a center pivot member 64. Preferably, the mirror actuators 60 may be implemented in an actuator module 59, which includes two actuators 60, a base portion 59a and an adapter or glass holder 59*b* pivotally mounted to the base portion 59*a* via pivoting member 64. As shown in FIG. 3, two actuators 60 may be positioned at 90° relative to one another and pivot member 64 to facilitate angling of mirror reflector 14*b* in any direction relative to housing 14*a*. A wire connector 82 may connect to each actuator 60, and further connect at another end to wiring 52, thereby providing power and control to the mirror positioning actuators 60 from within vehicle 12. Preferably, reflective element position actuator 60 comprises an ultrasonic motor and, more preferably, is a linear traveling wave ultrasonic motor.

Similar to mirror actuator 20, ultrasonic reflective element actuator 60 comprises a base 61, which includes a control (not shown) for selectively energizing a pair of piezo-electric elements 66*a* and 66*b*. Ultrasonic mirror positioning actuators 60 function substantially similar to the ultrasonic mirror actuator 20, discussed above. However, in order to provide linear movement of each portion of reflective element 14*b*, the pair of piezo-electric or piezo ceramic elements 66*a* and 66*b* are generally rectangular and are secured to a correspondingly shaped plate 68. The piezo electric elements 66*a* and 66*b* are similar to piezo-elements 28*a* and 28*b*, in that elements 66*a* and 66*b* include multiple piezo crystals or electrodes 66*c* spaced along their lengths. The elements 66*a* and 66*b* are likewise positioned such that the pitch or locations of the electrodes 66*c* are staggered or one half an electrode out of position relative to each other. Plate 68 preferably includes a plurality of teeth or combs 68*a* extending lengthwise along a surface 68*b* opposite from the piezo ceramic elements 66*a* and 66*b*. As shown in FIGS. 4A and 4B, plate 68 bends or curves, which causes teeth 68*a* to extend and retract, in response to a flexural vibration or pulsing of the piezo ceramic elements 66*a* and 66*b* via selective and sequential excitation of the electrodes, in a similar manner as piezo ceramic elements 28*a* and 28*b* and stator 30, discussed above. As the teeth extend, they impact, pivot and push against a linearly movable member or bar 70, to cause linear movement of the bar 70 in a direction generally opposite to the travelling wave form along the plate 68.

Movable member 70 includes a pivot head 70*a*, which is pivotally connectable with a correspondingly formed mounting member 72 along mirror or glass holder 59*b*. A friction pad (not shown) may further be included between movable member 70 and teeth 68*a* to further enhance engagement of the teeth 68*a* and movable member 70. Mirror positioning actuator 60 may further include a base or housing 78, which is secured to base portion 59*a* within mirror housing 14*a* of foldable portion 14 and which substantially encases the piezo elements 66*a* and 66*b*, plate 68 and movable member 70. The housing 78 further includes a spring member 80, which provides a compression force to the components to maintain engagement of the teeth 68*a* on movable member 70 as the teeth extend and impact the movable member 70 when the actuator 60 is actuated. Alternately, movable member 70 may be pivotally connectable with base portion 59*a* or housing 14*a* of foldable portion 14, while base 78 is secured to glass holder 59*b* or reflective element 14*b*, without affecting the scope of the present invention.

Although shown on a mirror assembly having a traveling wave ultrasonic motor for a powerfold mirror, it is further envisioned that the mirror positioning actuators 60 may be implemented on non-folding mirrors, manual folding mirrors, or conventional powerfold mirrors having a standard rotating shaft motor or the like. It is further envisioned that one or more ultrasonic reflective element positioning actuators in accordance with the present invention may be implemented on interior mirrors as well. For example, ultrasonic linear actuators may be implemented on interior electronic mirrors which are automatically adjustable in response to an output from a memory control, such that the mirrors adjust to the particular driver of the vehicle. The memory control may also control reflective element positioning actuators for the exterior mirrors as well, similar to the memory mirror system disclosed in commonly assigned U.S. Pat. No. 5,796,176, issued to Kramer et al., the disclosure of which is hereby incorporated herein by reference.

Similar to the power fold actuator 20, discussed above, non-armature electrical reflective element positioning actuators 60 are highly compact, lightweight and reliable, since they also include a minimal number of moving parts such as gear mechanisms and the like. Because of the minimal moving and rotating parts and lower rotational speed of the rotor shaft versus the high speed shaft of a conventional armature motor, the non-armature motors of the present invention are quieter than the conventional motors and thus may be highly desirable for interior mirror applications as well as exterior mirror applications.

Changes and modification in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. An exterior rearview mirror assembly for a vehicle comprising:

a movable portion and a non-movable portion, said mirror assembly comprising an exterior folding mirror assembly, wherein said movable portion comprises a mirror housing and said non-movable portion comprises a mirror mount; and an actuator comprising a traveling wave ultrasonic motor, said ultrasonic motor comprising a base, at least two generally circular piezoelectric rings and an elastic stator, said piezoelectric rings being secured to said stator, said piezoelectric rings and said stator being operable to rotate a rotary member, said actuator being operable to move said movable portion relative to said non-movable portion in order to pivot said mirror housing relative to said mirror mount between an operable position and a folded position, said base of said actuator being mounted to said mirror mount, said rotary member being mounted to said mirror housing such that rotation of said rotary member causes said mirror housing to pivot relative to said mirror mount between said folded position and said operable position, wherein said rotary member is integrally molded with at least a portion of said mirror housing.

2. The exterior rearview mirror assembly for a vehicle comprising:

a movable portion and a non-movable portion, said mirror asssembly comprising an exterior folding mirror assembly, wherein said movable portion comprises a mirror housing and said non-movable portion comprises a mirror mount; and an actuator comprising a traveling wave ultrasonic motor, said ultrasonic motor comprising a base, at least two generally circular piezoelectric rings and an elastic stator, said piezoelectric rings being secured to said stator, said piezoeletric rings and said stator being operable to rotate a rotary member, said actuator being operable to move said movable portion relative to said non-movable portion in order to pivot said mirror housing relative to said mirror mount between an operable position and a folded position, said base of said actuator being mounted to said mirror housing, said rotary member being mounted to said mirror mount such that rotation of said rotary member relative to said base causes said mirror housing to pivot relative to said mirror mount between said folded position and said operable position, wherein said rotary member is integrally molded with at least a portion of said mirror mount.

3. The exterior rearview mirror assembly of claim 2, wherein said rotary member includes a shaft which extends through openings in said stator, said at least two piezoelectric rings and said base to rotatably secure said rotatable member to said actuator.

4. The exterior rearview mirror assembly of claim 3, wherein said rotary member includes a shaft which extends through openings in said stator, said at least two piezoelectric rings and said base to rotatably secure said rotatable member to said actuator.

5. The exterior rearview mirror assembly of claim 4, wherein said shaft is hollow to provide a passageway for a cable, said cable being connected to at least one of an electro-optic mirror control, an electronic reflective element positioning actuator, an illumination source, an exterior temperature sensor, and an illumination sensor.

6. The exterior rearview mirror assembly of claim 2, further including a clamping device which is operable to limit movement of said movable portion relative to said non-movable portion in at least one of said operable position and said folded position, wherein said traveling wave ultrasonic motor further includes a friction liner, said clamping device being operable to energize at least one of said piezoelectric rings which causes at least a portion of said elastic stator to contact said friction liner.

* * * * *

UNITED STATES PATENT AND TRADEMARK OFFICE
CERTIFICATE OF CORRECTION

PATENT NO.   : 6,243,218 B1  
DATED        : June 5, 2001  
INVENTOR(S)  : Peter J. Whitehead It is certified that error appears in the above-identified patent and that said Letters Patent is hereby corrected as shown below:

Column 8,  
Line 55, "The" should be -- An --  
Line 58, "asssembly" should be -- assembly --  
Line 66, "piezoeletric" should be -- piezoelectric --

Column 10,  
Line 3, "claim 4" should be -- claim 3 --  
Line 19, insert -- 7. The exterior rearview mirror assembly of claim 5, wherein said illumination source comprises at least one of a turn signal indicator, a brake lamp, a security light, and a ground illumination light.

Signed and Sealed this

Twenty-second Day of July, 2003

JAMES E. ROGAN  
*Director of the United States Patent and Trademark Office*